US006284817B1

(12) United States Patent
Cross et al.

(10) Patent No.: US 6,284,817 B1
(45) Date of Patent: Sep. 4, 2001

(54) CONDUCTIVE, RESIN-BASED COMPOSITIONS

(75) Inventors: Robert Parkins Cross, Rocky Hill, CT (US); I. David Crossan, Glenmoore, PA (US); Lester D. Bennington, East Hartford, CT (US)

(73) Assignee: Loctite Corporation, Rocky Hill, CT (US)

( * ) Notice: Subject to any disclaimer, the term of this patent is extended or adjusted under 35 U.S.C. 154(b) by 0 days.

(21) Appl. No.: 09/515,662

(22) Filed: Feb. 29, 2000

Related U.S. Application Data

(63) Continuation of application No. 08/797,259, filed on Feb. 7, 1997, now abandoned.

(51) Int. Cl.[7] ................................. C08K 3/18; C08K 3/22
(52) U.S. Cl. ........................ 523/220; 524/430; 524/432; 524/433
(58) Field of Search ........................... 523/220; 524/430, 524/432, 433

(56) References Cited

U.S. PATENT DOCUMENTS

| | | | |
|---|---|---|---|
| 4,147,669 | 4/1979 | Shaheen | 252/512 |
| 4,444,944 | 4/1984 | Matsushita | 503/919 |
| 4,544,696 | 10/1985 | Streusand | 524/428 |
| 4,574,879 | 3/1986 | DeGree | 165/185 |
| 4,584,336 | 4/1986 | Pate | 524/443 |
| 4,588,768 | 5/1986 | Streusand | 524/443 |
| 4,604,424 | 8/1986 | Cole | 524/862 |
| 5,021,494 | 6/1991 | Toya | 524/404 |
| 5,430,085 | 7/1995 | Acevedo | 524/495 |
| 5,445,308 | 8/1995 | Nelson | 228/121 |
| 5,569,684 | 10/1996 | Okami | 523/209 |

FOREIGN PATENT DOCUMENTS

| | | | |
|---|---|---|---|
| 099 573 | 2/1984 | (EP) | H01B/1/22 |
| 7-292251 | 7/1995 | (JP) | C08K/3/22 |
| 9-302231 | 11/1997 | (JP) . | |

OTHER PUBLICATIONS

Chemical Abstracts CA 124:124432r (1996).
4 *Encycl. Polym. Sci. & Eng'g*, "Composites, Fabrication to Die Design", p. 343, Fig. 16, John Wiley & Sons, New York (1986).
*Handbook of Fillers for Plastics*, H.S. Katz and J.V. Milewski, eds., 6.1, p. 255 Van Nostrand Reinhold Co., New York (1987).
M. M. Konarski and J. Heaton, "Electronic Packaging Design Advances Miniatrization", *Circ. Assembly*, pp. 32–35, Aug. (1996).

*Primary Examiner*—Kriellion Sanders
(74) *Attorney, Agent, or Firm*—Steven C. Bauman

(57) ABSTRACT

The invention provides a conductive, resin-based composition, which includes a resinous material, and a conductive filler dispersed therein. The conductive filler includes a first conductive filler component and a second conductive filler component. The particles of the first conductive filler component are harder than those of the second conductive filler component, when measured using the Mohs hardness scale. The composition is subjected to shear mixing forces which shearingly disperse the first and second conductive filler components throughout the resinous material in such a way that the particles of the second conductive filler component occupy the interstitial voids within the network of first conductive filler component particles contained in the resinous material and thereby enhance conductivity.

22 Claims, 7 Drawing Sheets

CONDUCTIVE, RESIN-BASED COMPOSITIONS

This application is a continuation of application Ser. No. 08/797,259 filed Feb. 7, 1997 now abandoned.

BACKGROUND OF THE INVENTION

1. Field of the Invention

The present invention relates generally to conductive, resin-based compositions, such as those which include thermally conductive fillers, which are useful as sealants, coatings, adhesives, and the like.

2. Brief Description of Related Technology

Advances in the electronic industry have made thermal management an increasingly important consideration, particularly with respect to packaging issues. For instance, heat build-up in electronic products leads to reduced reliability ("mean-time-to-failure"), slower performance, and reduced power-handling capabilities. In addition, continued interest in increasing the number of electronic components on, and reducing the size of, semiconductor chips, notwithstanding the desire generally to reduce power consumption thereof, also contributes to the importance of thermal management. Also, chip-on-board technology, where semiconductor chips are mounted directly to printed circuit boards, creates further demands on thermal management because of the more efficient use of surface area thereon. Thus, it is not surprising that packaging technology has been called one of the greatest single factors limiting the electronics industry. See M. M. Konarski and J. Heaton, "Electronic Packaging Design Advances Miniaturization", *Circ. Assembly*, 32–35 (August 1996).

Thermal management or heat dissipation techniques include generally convection or conduction mechanisms, where heat may be removed from electronic devices (such as operating silicon integrated circuits) by air (e.g., free flowing or forced) convection around the device, fluid (e.g., water or fluorocarbons) convection through radiators, or conduction through parts thereof which are in physical contact. A combination of such techniques is often used to maintain temperatures within design criteria.

Heat convection involves heat transfer across an interface which is proportional to (1) the amount of area exposed, (2) the temperature differential, and (3) the heat transfer coefficient, at the interface. Heat conduction, on the other hand, involves heat flow per unit area over a length which is proportional to the temperature gradient across that length. Thus, heat conduction (or thermal conductivity) is a steady-state property measuring the ability of a certain material to transfer heat therethrough. All else being equal, convection requires a larger surface area than conduction to allow the same amount of heat to dissipate. Of course, with continued size reduction of electronic packaging, surface area is reduced, thereby rendering convection less desirable.

A heat sink, constructed from a light weight thermally conductive material, such as aluminum alloy or graphite composite, is often used with electronic devices to facilitate heat dissipation therefrom. The heat sink should have sufficient mass to obtain a heat capacity which does not exceed a heat flow to the environment, which itself should be matched with heat flow from devices with which the heat sink is to be used.

Heat sinks have heretofore had varying measures of success, one reason for such variance is interfacial thermal resistance between the heat sink and the heat-generating electronic device. Generally, such resistance may be minimized by positioning at the interface junction between the electronic device and the heat sink a material having (1) high thermal conductivity, (2) intimate surface contact with the heat sink and electronic device, and (3) good durability, such as is measured by thermal cycling which detects failure or performance loss at the interface junction between the heat sink and the heat-generating device. Mechanical fasteners and thermally conductive greases, mica chips and ceramic insulators, pads and tapes, and adhesives have been used as such heat sinks or interface materials.

Mechanical fasteners are durable, but often provide high interfacial thermal resistance due to microscopic interfacial voids, which are present even in highly polished surfaces.

Surface contact with such fasteners may be improved using a thermal grease which penetrates such interfacial or surface voids, thereby effectively lowering interfacial thermal resistance. However, such greases generally tend to lack solvent resistance and often migrate over time out of the interface junction. Some users also consider thermal greases to be time-consuming and messy to apply, and difficult to cleanup. In addition, upon application of a thermal grease, solder processes should be avoided to minimize contamination. It is also advisable to avoid placing in cleaning baths thermal grease-containing components so as to minimize wash out of the thermal grease from the interface junction, the result of which would cause both a dry junction (and hence increased thermal resistance) and bath contamination.

Mica chips are inexpensive and have excellent dielectric strength; however, they are also brittle and easily damaged. In addition, mica itself has high thermal impedance, and as a result thermal greases are ordinarily also applied thereto. Ceramic insulators are costly and brittle, and thus easily damaged like mica chips.

Thermally conductive pads are laminated composite materials, which are often coated with pressure-sensitive adhesives to facilitate bonding and good thermal contact with the substrate surfaces between which they are positioned. See e.g., U.S. Pat. No. 4,574,879 (DeGree). Examples of such conductive pads include those commercially available from the W.R. Grace unit, Chomerics, Inc., Woburn, Massachusetts under the "CHO-THERM" trademark. The core of the pad generally is highly thermal conductive, while the coating itself is a compliant material having low thermal conductivity. Thus, thermal performance of conductive pads is often a function of mounting pressure and operating temperature, with the degree of surface penetration of the coating to the mating surfaces determining interfacial thermal resistance. Thermally conductive tapes perform in a like manner. See e.g., U.S. Pat. No. 5,510,174 (Litman).

Thermally conductive adhesives are curable (as contrasted to greases which are not intended to be curable) but like greases often contain thermally conductive fillers, commercially available examples of which include those supplied by Thermoset, Indianapolis, Ind. or Creative Materials Incorporated, Tyngsboro, Mass. These adhesives perform in a similar manner to greases, except that the adhesives, if formulated and applied properly and to appropriate surfaces, should not migrate from the interface junction.

Various thermally conductive adhesives are known for use in a number of applications, such as sealants, fuser roll coatings in electrostatic copying machines, bonding media, and the like. Resins employed in such compositions should themselves be thermally stable, examples of which include silicone, epoxy, phenolic, vinyl and acrylic materials. Silicones are particularly desirable resins because of, for instance, their high elasticity for stress relief, low moisture uptake, ionic purity, wide-range temperature performance, and excellent electrical properties, such as electrical insulating properties.

It is often desirable, however, to enhance the thermal conductivity of such adhesives, which of course depends on the conductivity of the resin itself. Improved thermal conductivity may often be attained by the addition of a conductive filler to the resin matrix. [See Handbook of Fillers for Plastics, 6.1, 255, H. S. Katz and J. V. Milewski, eds., Van Nostrand Reinhold Co., New York (1987); see also U.S. Pat. Nos. 4,147,669 (Shaheen)(gallium, aluminum, and gold, copper or silver in a resin); 4,544,696 (Streusand), 4,584,336 (Pate) and 4,588,768 (Streusand) (silicon nitride-containing organopolysiloxane with aluminum oxide or zinc oxide); 5,011,870 (Peterson) (aluminum nitride, and silicon metal and boron nitride in a polyorganosilicone resin matrix); and 5,352,731 (Nakano)(aluminum oxide-containing silicone rubber).]

U.S. Pat. No. 5,430,085 (Acevedo) describes a thermally and electrically conductive caulk including a resin, such as silicone, mixed with a filler which includes 80% by weight conductive particles with a particle size in the range of 300 to 325 microns, 10% by weight conductive particles with a particle size in the range of 75 to 80 microns, and 10% by weight conductive fibers having a length in the range of 0.020 to 0.025 inches.

U.S. Pat. No. 4,604,424 (Cole) describes thermally conductive silicone elastomers containing a polydiorganosiloxane, a curing agent, a platinum-containing hydrosilation catalyst, and zinc oxide and magnesium oxide fillers, the particle size of which fillers is such that substantially all of the filler particles pass through a 325 mesh screen, and the average particle size of which fillers is below 10 microns. The filler is composed of 50% to 90% zinc oxide, and 10% to 50% magnesium oxide, each by weight of the filler. Other fillers (up to 40% by weight) include aluminum oxide, ferric oxide and carbon black. The cured elastomers are said to resist erosion by abrasive materials to a greater extent than compositions containing aluminum oxide as the sole filler.

In U.S. Pat. No. 5,445,308 (Nelson), another method of improving thermal conductivity provides a connection between spaced surfaces by mixing a thermally conductive filler containing a liquid metal (e.g., gallium, gallium/indium, gallium/indium/tin and/or mercury) into an unhardened matrix material (e.g., thermoplasts, thermosets, UV-curable materials, epoxies and solvent-bearing materials) and thereafter hardening the matrix material.

An English-language abstract of Japanese Patent Document JP 07-292251 appears to relate to curable thermally conductive electrically insulating magnesium oxide-containing silicone compositions.

Chemical Abstracts CA 124:124432r (1996) refers to explosive compaction of aluminum nitride powders for use with silane elastomer precursors, which when polymerized are reported to have improved thermal conductivity of the so-formed polymer-ceramic composites.

Conductive particles are ordinarily manufactured for use though comminution of larger particles of a desired material into smaller particles by milling or grinding techniques and subsequent size segregation. Milling or grinding may be accomplished using a variety of mechanical mixing devices which provide intensive agitation to thoroughly mix together materials. In these devices, shear is produced, the degree of which depends on the speed at which contact is made between the agitation-producing components of the mixing device and the materials to be mixed as well as the mixer design. See Generally N. P. Cheremisinoff, *Polymer Mixing and Extrusion Technology,* Marcel Dekker, Inc., New York (1989).

Generally, it is noteworthy that percolation theory predicts that in the same volume a thermally conductive material having a larger particle size should demonstrate greater thermal conductivity than the same material having a smaller particle size. See e.g., 4 *Encycl. Polym. Sci. & Eng'g,* "Composites, Fabrication to Die Design", p. 343, FIG. 16, John Wiley & Sons, New York (1986). Accordingly, conventional wisdom would lead one to desire to maximize the particle size of conductive filler used in a filled resin.

Nevertheless, to date, it is not believed that such shear mixing has been used to comminute the particle size and geometric shape of a conductive filler with the intent of increasing the thermal conductivity of a resin throughout which it is dispersed.

Improvements in thermal management techniques are seen as necessary in order to foster commercially acceptable advances in the electronics industry. Thus, improved thermally conductive, resin-based compositions are a continuing challenge. There, therefore, is a need for conductive, resin-based compositions having superior conductivity characteristics without compromising the integrity of their mechanical properties or the mechanical properties of a cured reaction product.

SUMMARY OF THE INVENTION

The present invention provides a resin-based composition exhibiting desirable conductive and physical properties, and meets the need addressed above.

More specifically, the present invention relates to a conductive, resin-based composition, which includes a resinous material, and a conductive filler dispersed therein. The conductive filler includes a first conductive filler component and a second conductive filler component. The particles of the first conductive filler component are harder than those of the second conductive filler component when measured using the Mohs hardness scale. The composition is subjected to shear mixing forces which shearingly disperse the first and second conductive filler components throughout the resinous material. In addition, the volume fraction of conductive filler throughout the resinous material is desirably in the range of about 30 to about 65% by volume of the compositions. Also, the by weight ratio of first conductive filler component to second conductive filler component in the composition is in the range of about 1:6, desirably about 1:4.

In another aspect of the invention, there is provided a method of preparing a conductive, resin-based composition including a resinous material and a conductive filler. The method includes the steps of providing a first conductive filler including a first conductive filler component and a second conductive filler component, and a resinous material to form a mixture and subjecting the so-formed mixture to shear mixing conditions effective to cause the first conductive filler component to shearingly comminute the second conductive filler component to a reduced particle size and often change the geometric shape thereof. As a result of such shear mixing, a densely packed conductive filler is dispersed throughout the resinous material with a volume fraction of conductive filler being in the range of about 30 to about 65% by volume of the composition.

In yet another aspect of the invention, there is provided the reaction product of a curable conductive composition, which composition includes a first conductive filler, a second conductive filler and a resinous material which have been subjected to shear mixing. The composition may be cured to form the reaction product by heat, moisture, photoirradiation, and combinations thereof.

The present invention differs from known conductive, resin-based compositions having fillers of different particle sizes by using at least two conductive filler components of different hardnesses. In addition, the action of shear mixing forces on such conductive filler components comminutes the softer of the conductive fillers at a faster rate than the harder of the conductive fillers and increases the loading or filler density within the resin matrix. By appropriate control of shear mixing forces, the softer filler particles may be reduced in size and changed in geometric shape such that interstitial voids between the harder filler particles are filled with the comminuted softer filler particles, resulting in improved filler packing density and enhanced conductivity, particularly thermal conductivity. This is accomplished without regard to the particle size of the respective conductive filler components, provided of course that the softer of the conductive fillers is reduced in particle size relative to the harder of the conductive fillers when the mixture is subjected to shear mixing. As a result of the shear mixing forces and the different hardnesses of the conductive filler components, a conductive, resin-based composition with a volume fraction of conductive filler in the resin matrix in the range of about 30 to about 65% by volume of the composition is formed.

Other aspects and features of the invention will be more readily apparent from the ensuing disclosure and claims.

DETAILED DESCRIPTION OF THE INVENTION

Figure 1:
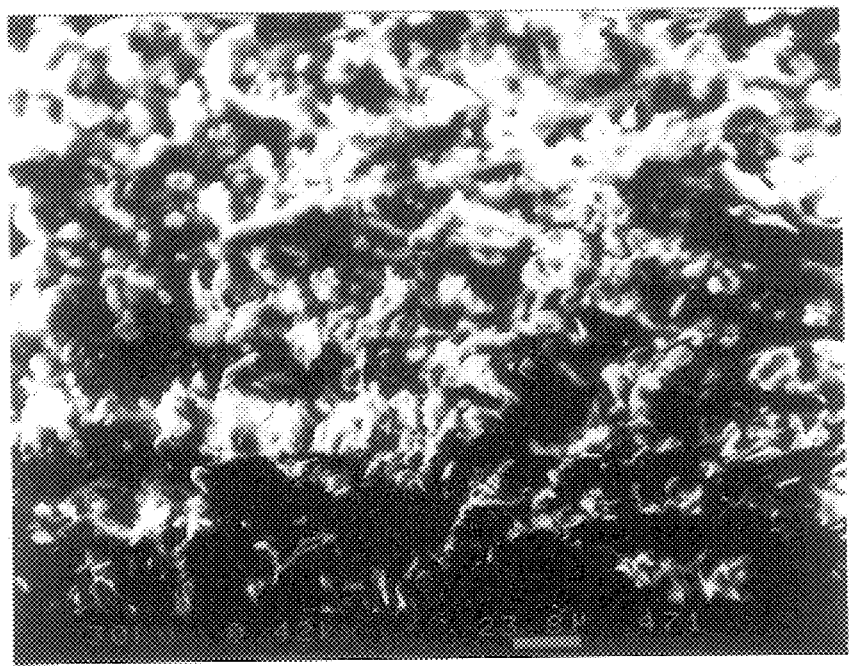
FIG. 1 is a secondary scanning electron micrograph of a silicone composition containing aluminum oxide.

The present invention provides a resin-based composition demonstrating desirable conductive and physical properties. Conductivity of such a resin-based composition is seen to be substantially increased by including therein a conductive filler, with the increase being synergistic based on the combination of two or more conductive filler components, and with the softer of the conductive filler components filling the interstitial voids formed between the harder conductive filler component(s) so as to increase the conductivity of the composition.

More specifically, the present invention relates to a resin-based, conductive composition, which includes a resinous material, and a conductive filler dispersed therein. The conductive filler includes at least a first conductive filler component (such as an inorganic or metallic material) and a second conductive filler component (such as an inorganic or metallic material, which preferably is different from the one chosen as the first conductive filler component).

It is within the spirit and scope of the present invention for additional conductive filler components to be used together with the first and second conductive filler components. It is advantageous, however, to use a bicomponent conductive filler mixture, such as a first conductive filler component which is harder (as measured by conventional hardness tests, such as Mohs hardness) in relation to the second conductive filler component. And, of course, the conductive filler components themselves are thermally conductive.

As stated above, the first and second conductive filler components may be inorganic or metallic, and may include as appropriate choices iron, aluminum, zinc, silver, gold, lead, nickel, magnesium, boron, barium, platinum, palladium, copper, zirconium, titanium, uranium, vanadium, niobium, tungsten, silicon and conductive derivatives thereof, such as oxides and nitrides, as well as carbon, graphite, silicon carbide, and the like, and combinations thereof.

It will be recognized by the skilled artisan that various combinations of metals, metal oxides and/or metal nitrides are contemplated within the scope of the invention. For instance, aluminum nitride (such as is commercially available from Advanced Refactory Technologies, Inc., Buffalo, N.Y. or Keramont Corporation, Tucson, Ariz.), magnesium oxide (such as is commercially available from Kaopolite Incorporated, Union, N.J. or Harbison-Walker Refractories Company, Pittsburgh, Pa.), and aluminum oxide (such as is available commercially from Whittaker, Clark & Daniels, Inc., South Plainfield, N.J.) are desirable choices for the first conductive filler component, with aluminum oxide being particularly desirable. Zinc oxide (such as is available commercially from Zinc Corporation of America, Monaca, Pa.) is a particularly desirable choice for the second conductive filler component.

The particles of the first conductive filler component are harder than those of the second conductive filler component, when measured using conventional hardness tests such as the Mohs hardness scale. The differences in relative hardnesses between the first and second conductive filler components is seen to provide a means by which size reduction of the softer of the components may be facilitated. That is, during formulation of the composition, conductive filler components are mixed in a resinous material during which mixing the harder of the conductive filler components acts to comminute the softer of the conductive filler components. The comminuted softer conductive filler component may then fill the interstitial voids created within the network or matrix of harder conductive filler components. The degree of difference of relative hardnesses is not critical, provided that the first conductive filler component is harder than the second conductive filler component, such as when measured using a Mohs hardness test. Of course, the greater is the difference in relative hardness between the first and second conductive filler components, the greater is the degree of comminution of second conductive filler component particles, all else being equal.

In conductive, resin-based compositions according to the present invention, the first and second conductive filler components are thermally conductive and may also possess desirable electrical properties, such as electrical conductivity. The conductivity, particularly thermal conductivity, of filled, resin-based compositions depends at least in part on the concentration or loading level (or volume fraction) of the conductive filler in the composition. Of course, conductivity also depends on the inherent properties of the conductive filler, as well as the spatial arrangement of conductive filler particles within the resin matrix.

More specifically, the conductivity, volume fraction and dispersion of the conductive filler in the resin matrix aid in determining the degree of observed improvement in thermal conductivity. Further improvement may also be achieved by enhancing filler contact throughout the resin matrix. That is, the particle size, geometry and relative dispersion and spatial arrangement of the conductive filler within the resin matrix also aid in determining the degree of thermal conductivity of the filler-containing resin. See supra *Handbook of Fillers for Plastics*. In this regard, it may be advantageous to enhance the density of filler packing within the resin matrix by blending particles of different sizes so as to further enhance the filling of voids therebetween. It is generally desirable that the thermal conductivity of conductive filler-containing compositions (and cured materials formed therefrom) be as high as possible in the chosen end use applications of such materials.

In order to increase thermal conductivity, the amount of conductive filler in the composition should desirably be increased. The addition of conductive filler to resin also increases the viscosity thereof, up to a maximum filler loading which permits dispensing of the material. Generally, higher concentrations of a conductive filler should result in greater conductivity, all else being equal. However, the addition of too much conductive filler may compromise the rheological properties of the composition [yielding significantly increased viscosity (thereby decreasing the flowability and dispensability of the composition)] and the mechanical integrity and adhesive/cohesive properties of the end use cured product (due to high susceptibility to cracking, reduced bonding properties and problems with manufacture) because of insufficient resin concentration. And non-homogeneity may also result (due to settle-out of the thermally conductive filler from the associated resin). An appropriate balance therefore should be reached between conductivity—e.g., thermal—and resin properties, and the specific application with which the filled, resin-based composition is desirably used.

A representative conductive filler may include a first conductive filler component in an amount within the range of from about 65% to about 95% by weight of the conductive filler, and a second conductive filler component in an amount within the range of from about 5% to about 35% by weight of the conductive filler, with the weight percentages of the first and second conductive filler components totaling 100%.

The resinous material employed in the resin-based compositions of the present invention may be of any suitable type and composition. For instance, suitable resinous materials include silicones, acrylates or (meth)acrylates, epoxies, urethanes, polyalkylenes, polyvinyl halides, polyesters and combinations thereof. For grease applications of the conductive compositions of the present invention, each of such materials is not intended to be cured and as such may be chosen from non-polymerizable materials. More specifically, certain suitable resins for such non-cure applications include polyethylenes, polypropylenes, polyvinylchloride, polybutylterephthalate and the like.

With respect to curable resinous materials or resinous materials intended to be cured, any appropriate curing modality may be employed, including heat cure resins, irradiation or photo (e.g., visible or ultraviolet light) cure resins, anaerobic cure resins, moisture cure resins, or resins which cure by combinations of the foregoing cure modalities, or by other suitable cure methods, techniques or mechanisms.

Of the curable resins which may be used herein, particularly desirable ones include silicone resins, epoxy resins, and acrylate and (meth)acrylate resins, with silicone resins, particularly platinum-catalyzed addition cure silicone resin formulations, being preferred.

The resin-based compositions of the present invention may be prepared by introducing the respective conductive filler components to the resinous material, followed by a shear mixing addition thereto of the conductive fillers chosen. As used in this context, shear mixing refers to the application of mechanical shear action to the mixture of the resinous material and conductive filler, such as for example from an impeller, blade or paddle-type mixing apparatus.

Mixing may be performed in a shear mixer, such as a dough mixer, equipped with sigma blades or in a blending apparatus, such as a Waring blender. Of course, Banbury mixers, roller mills, anchor agitators, centrifugal disk-type mixers and the like as well as planetary kneader mixing apparatus, such as Model MPVDV-10 from Jaygo, Incorporated, Mahwah, N.J., may also be used. Such mechanical mixing imparts shear forces on the conductive filler which function to grind or mill the softer conductive filler component to a reduced particle size and often changed geometric shape through interaction with the mixing apparatus and/or the harder conductive filler component. As a result of their greater hardness, the first conductive filler component particles are more resistant to comminution and size reduction from the mixing apparatus experienced by the softer particles of the second conductive filler component, and themselves act to comminute the softer particles. The so-mixed and comminuted second conductive filler component particles are capable of filling interstitial voids which form between the harder filler particles in the resin matrix of the composition, thereby enhancing the volume fraction of the conductive filler in the filled conductive resin.

The choice of mixing conditions, including shear levels, tip speeds of impeller blades, mixing duration, and the like may be readily determined by those persons skilled in the art for the particular composition under examination using routine, rather than undue, experimentation. The result of such size reduction is a substantially uniform, densely packed filler in the conductive, resin-based composition and in the case of a curable composition the final cured reaction product thereof.

In preparing conductive, resin-based compositions according to the present invention, the mixture of the resinous material and the first and second conductive filler components are subjected to shear mixing forces so that the second conductive filler component is shearingly contacted with the first conductive filler component so as to become reduced in size, and may be twisted and compressed in geometric shape, and dispersed throughout the resin matrix. Such shearing dispersion allows for the milled second conductive filler component to fill the interstitial voids formed in the matrix of the first conductive filler component and create essentially continuous contact and conductive continuity throughout the resin matrix. In this manner, enhanced conductivity throughout the conductive, resin-based composition may be achieved.

Figure 8:
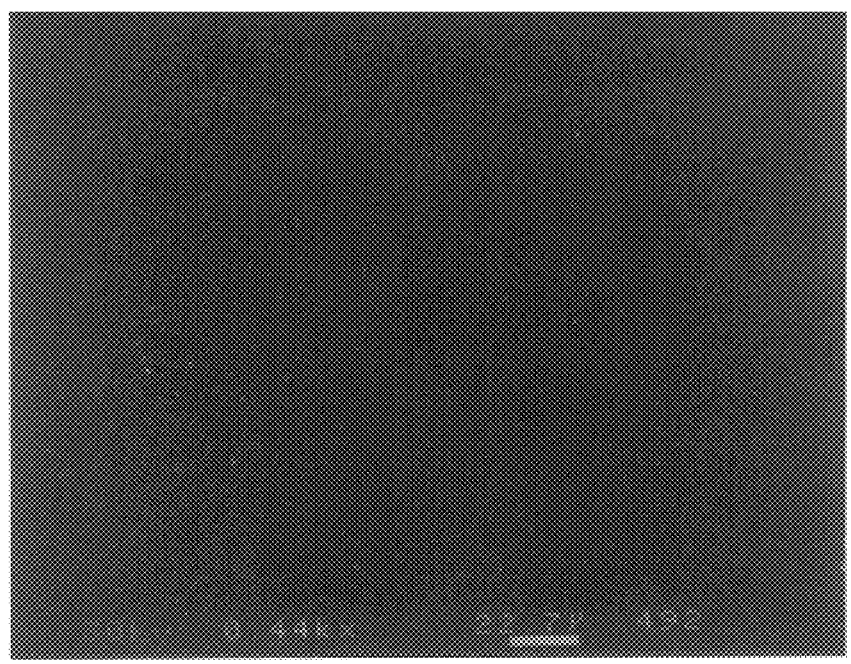
FIG. 8 is an x-ray dot map image of a silicone composition in accordance with the present invention containing aluminum oxide and zinc oxide, the x-ray dot image showing both the aluminum oxide and zinc oxide particles.

The conductive, resin-based composition may be formulated so that when cured, the reaction product has an energy dispersive x-ray spectrometry image substantially similar to that shown in FIG. 8.

With conductive, resin-based compositions in accordance with the present invention, after subjection to shear mixing forces, the particle size of the first conductive filler component may be in the range of from about 10 to about 15 microns and the particle size of the second conductive filler component may be in the range of from about 1 to about 10 microns, with about 3 to 7 microns being desirable. Of course, prior to subjection to such shear mixing forces, the second conductive filler component employed may have a particle size greater than about 10 microns. In fact, prior to subjection to shear mixing forces the second conductive filler component particles may be substantially the same size or even greater in size than the first conductive filler component particles. Desirably, however, the average particle size of the second conductive filler component may be about 5 microns, and the average particle size of the first conductive filler component may be about 12 microns.

The particle size of the conductive filler components reflects the average particle size as within a numerical range, as well as the range itself including at least 75% of the particles in the specified filler component. When the size is specified as a single numerical value (e.g., of about 5 microns or about 12 microns), the specified numerical value refers to a mean particle size for a conductive filler component, at least 75% of whose particles are within 25% of such numerical value.

It may be desirable for the relative particle sizes of the first and second conductive filler components to be such that the harder particles (i.e., the first conductive filler component) are from about 1 to about 10 times the size of the softer particles (i.e., the second conductive filler component), with the size of the second conductive filler particles being for example between about 10 and about 40 microns. It may be desirable for the harder particles to be between about 1.75 and about 5 times the size of the softer particles, with a particularly advantageous size of the harder particles being from about 2 to about 3 times that of the softer particles.

After subjection to shear mixing, the first and second conductive filler components may be densely packed in a substantially uniform manner within the resin matrix of the conductive composition. The composition should be formulated, for example, so that the packing of the first and second conductive filler components is denser than that of either the first or second conductive filler components alone, at otherwise equal weight percent concentration in the conductive, resin-based composition.

Thus, where the first conductive filler component is aluminum oxide, whose specific gravity is 3.98 grams/cc, and the second conductive filler component is zinc oxide, whose specific gravity is 5.6 grams/cc, the volume occupied by aluminum oxide is 1/3.98 (or 0.25) cc/grams and the volume occupied by zinc oxide is 1/5.6 (or 0.18) cc/grams. And when combined as the conductive filler in a by weight ratio of, for instance, about 1:4, the conductivity of the first and second conductive filler components in similar volume is greater than the conductivity of either of those components individually. Indeed, the enhanced packing of filler components observed in the composition is seen to result in increased or improved thermal conductivity.

The conductive filler advantageously is present in the resinous material in an amount from about 25% to about 95% by weight of the total weight of the conductive, resin-based composition. For instance, the conductive, resin-based composition may be formulated so that the first conductive filler component includes aluminum oxide particles at a concentration of from about 50% to about 75% by weight of the resin-based conductive composition, and the second conductive filler component includes zinc oxide particles at a concentration of from about 5% to about 50% by weight of the resin-based conductive composition.

The resin-based conductive compositions of the present invention may contain, in addition to the resin and thermally conductive filler, other suitable components, including polymerization initiators, adhesion promoters, inhibitors, stabilizers, anti-oxidants, non-conductive fillers (where reinforcement of the composition or suspension of component particles is desirable), surfactants, dispersing agents, colorants, and the like. Appropriate choices and amounts of such components may be made by those persons having skill in the art without undue experimentation.

A particular conductive composition in accordance with the present invention includes a curable silicone resin, throughout which is dispersed a thermally conductive filler, such as one including from about 65% to about 95% by volume of aluminum oxide particles and from about 5% to about 35% by volume of zinc oxide particles, based on the total volume of the thermally conductive filler.

After the resin-filled mixture has been subjected to shear mixing, the average size of the aluminum oxide particles is in the range of from about 10 to about 15 microns, and the average size of the zinc oxide particles is in the range of from about 3 to about 7 microns. Aluminum oxide (with an average particle size of about 12 microns) and zinc oxide (with an average particle size of about 5 microns) provide a dense and uniform particle distribution throughout a chosen resinous material. In such instance, the volume fraction of the conductive filler is in the range of from about 30% to about 65% by volume of the composition, with the volume fraction of the aluminum oxide being within the range from about 65% to about 95% by volume and the volume fraction of the zinc oxide being within the range of from about 5 to about 35% by volume of the conductive filler.

Compositions in accordance with the present invention which are curable or intended to be cured may be cured through controlled temperature (i.e., at temperatures ranging from ambient to about 200° C.), air or moisture conditions, or through exposure to electromagnetic radiation of an appropriate wavelength (e.g., within the ultraviolet and/or visible range). Of course, depending on the type of cure mechanism desired, appropriate additives may be included in the composition to initiate or enhance the rate of cure, such as, for instance, heat and/or moisture cure promoters as are well-known in the art or various free radical propagators which are also known to enhance the rate of cure in heat and/or radiation cure systems.

The following examples are provided to illustrate certain features and aspects of the present invention, and are in no way to be construed as limiting the full scope of the teaching described herein.

EXAMPLES

Formulation of Thermally Conductive Silicone Elastomer Compositions

Thermally conductive compositions in accordance with the present invention were prepared using as the first conductive filler component either 325 mesh aluminum oxide (commercially available from Whittaker, Clark & Daniels) or aluminum nitride (commercially available from Advance Refractories) and as the second conductive filler component 325 mesh zinc oxide (commercially available from Zinc Corporation of America under the trade designation "KADOX" 930). As the resinous material, a combination of the following silicone materials were employed: vinyldimethyl terminated dimethyl silicone and trimethyl terminated methylhydrogen dimethyl silicone co-polymer, each of which is commercially available from Mazer Chemical, Chicago, Illinois, a division of PPG Industries, Pittsburgh, Pa.

In addition, a material which renders the formulation a one-part composition, such as 3,5-dimethyl-1-hexyn-3-ol (commercially available from Air Products Co., Allentown, Pa.), an adhesion promoter to aid in adhesion to the surface of a substrate on which it is applied, such as 3-glycidoxypropyltrimethoxy silane (commercially available from OSI Specialties, Sisterville, W.V.), and a platinum complex catalyst solution (such as Baysilone U catalyst PtL, commercially available from Bayer Corporation, Pittsburgh, Pa.) were used in formulating the compositions.

Each composition was formulated using a Jaygo Model MPVDV-10 double planetary kneader-mixer with a central disperser set on low speed (500 rpm) for the planetary and set on high speed (5000 rpm) for the disperser portion of the apparatus. The temperature of the kettle of the apparatus was maintained at about 150° C. and in order to aid in dispersing and wetting the filler, a vacuum of about 1 mm Hg was drawn on the kettle.

The silicone materials were added to the kettle with mixing, followed by about one-half of the aluminum oxide. Mixing was continued at low speed for a period of time of about 10 minutes to wet the aluminum oxide so as to minimize dust generation. The remaining portion of aluminum oxide was then added and mixing continued at low speed for a period of time of about 1 hour, with the kettle maintained at a temperature of about 150° C. under a reduced pressure of about 1 mm Hg.

Thereafter, about one-half of the zinc oxide was added to the aluminum oxide silicone resin mixture and mixing was allowed to continue for a period of time of about 10 minutes at high speed. The remaining portion of zinc oxide was then added and mixing continued at high speed for a period of time of about 3 hours, with the kettle maintained at a temperature of about 150° C. under a reduced pressure of about 1 mm Hg.

The mixture was then allowed to cool to room temperature, and 3,5-dimethyl-1-hexyn-3-ol in an amount of about 0.3% by weight, the silane adhesion promoter in an amount of about 1% by weight and the platinum complex catalyst solution in an amount of about 0.88% by weight were added to the mixture. Mixing was then allowed to continue at low speed for a period of time of about 5 to 10 minutes under a reduced pressure of about 1 mm Hg. Thereafter, the composition was packaged in 300 ml cartridges using conventional packaging techniques.

In addition, compositions were formulated using only zinc oxide as the thermally conductive filler, as were compositions using only aluminum oxide as the thermally conductive filler. The compositions containing only a single conductive filler component were formulated using the same procedure as described above, except that a second conductive filler component was not added and mixing was maintained at a low speed for only a one hour time period. Sample Nos. 1–15 are presented below in Table 1, together with the components of the compositions, the conductive filler volume fractions and thermal conductivity.

Curing Of Thermally Conductive Silicone Compositions

The compositions were cured by dispensing an appropriate amount thereof onto a teflon mold of a Carver Heated Press to form a sheet of a thickness of about 0.320 cm. The dimensions of the mold are about 5"×5"×0.75", and the operational temperature of the mold was elevated to about 130° C. After a period of time of about 0.5 hours, a cured material in the form of a sheet having the dimensions of the mold was prepared.

Determination of Thermal Conductivity

The thermal conductivity of cured compositions of the formulations described above was determined according to the Guarded Heat Flow Meter method, as described in ASTM F 433, "Standard Practice for Evaluating Thermal Conductivity of Gasket Materials", and measured at a temperature of about 100° C.

Each of the cured compositions was cut into a sample disk having a diameter of about 2 inches and a thickness of about one-eighth inch. The sample disk was then placed between an upper and a lower plate of a Holometrix Model TCA-300 instrument (Holometrix, Bedford, Mass.), with each plate being at a different temperature to produce a heat flow through the sample disk. For instance, the temperature of the upper plate and the temperature of the lower plate should be adjusted accordingly so that the sample disk obtains a desirable temperature, such as about 100° C. The Holometrix instrument correlates the temperature differences of the two plates with the heat flow therebetween, and calibrates the heat flow by comparison with standard materials of known thermal conductivity. In this case, the heat flow through the sample disk was measured with a heat flux transducer contained in the lower plate. A thin layer (about less than 1 mil) of thermally conductive silicone grease having a thermal conductivity of about 1 W/m-K was used as a heat sink and was applied to both surfaces of the sample disk. The sample disk was maintained between the two plates, with a pressure of about 20 psi. Thermal conductivity was determined by dividing the sample thickness by the thermal resistance, which was measured as described above.

Thermal conductivity measurements for compositions in accordance with the present invention (i.e., Sample Nos. 1–4 and 14, each of which containing two conductive filler components) and comparative compositions (i.e., Sample Nos. 5–13 and 15, each of which containing a single conductive filler component) are set forth below in Table 1. Those thermal conductivity measurements are also depicted graphically in FIGS. 10 and 11. More specifically, in FIG. 10, the closed circle represents aluminum oxide, the closed star represents zinc oxide, and the closed diamond represents the combination of aluminum oxide and zinc oxide, and in FIG. 11, the closed circle represents aluminum nitride, the closed star represents zinc oxide, and the closed diamond represents the combination of aluminum nitride and zinc oxide.

Figure 10:
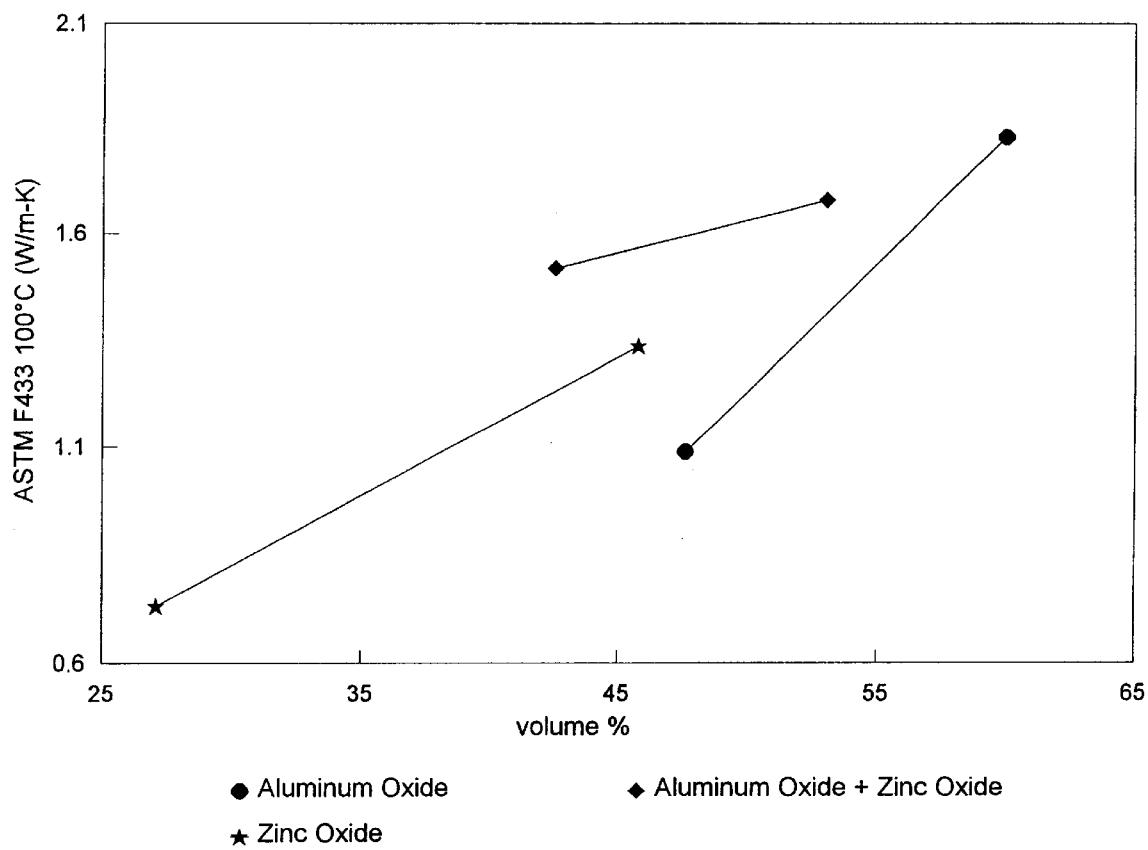
FIG. 10 is a plot showing on the x-axis volume percent of conductive filler (aluminum oxide, zinc oxide and combinations thereof) in cured silicone compositions and on the y-axis thermal conductivity of these cured silicone compositions.
Figure 11:
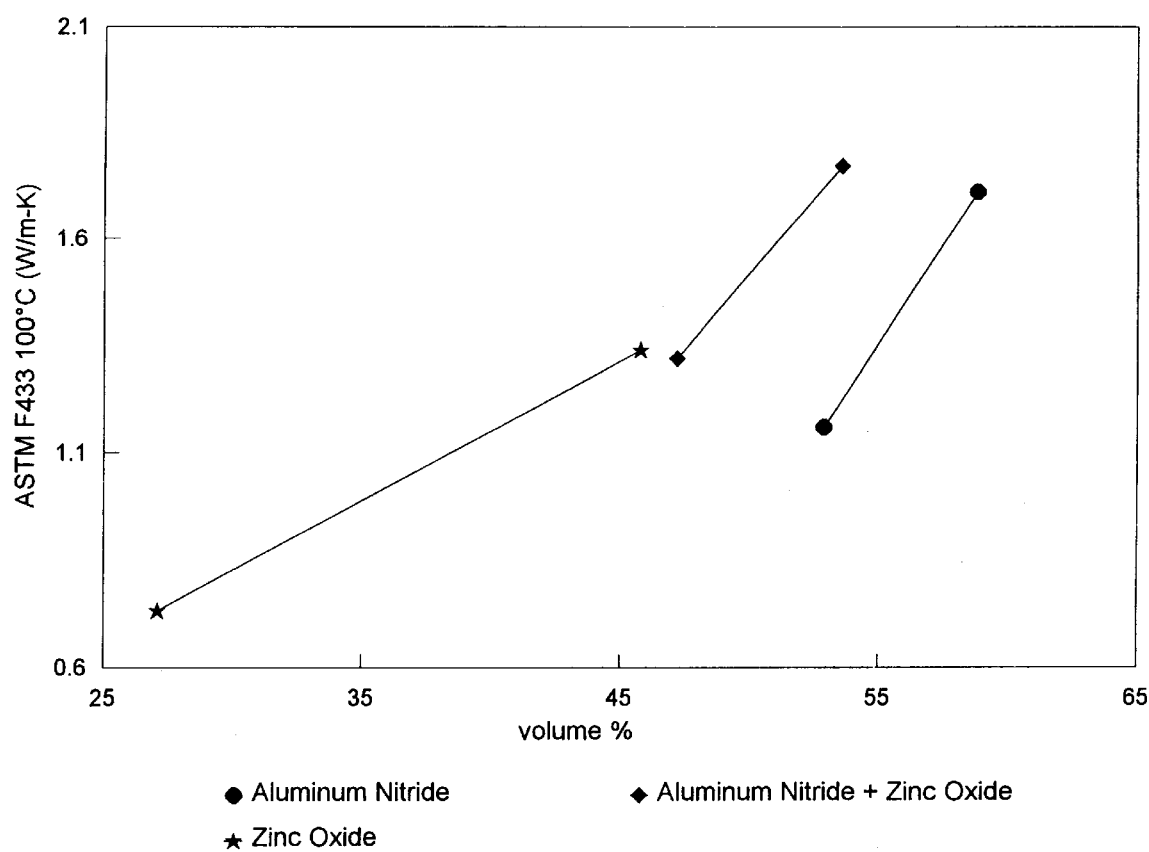
FIG. 11 is a plot showing on the x-axis volume percent of conductive filler (aluminum nitride, zinc oxide and combinations thereof) in cured silicone compositions and on the y-axis thermal conductivity of these cured silicone compositions.

As is evident from the thermal conductivity measurements recorded in Table 1, and with reference to FIGS. 10 and 11, the thermal conductivity of either the aluminum oxide-, aluminum nitride- or zinc oxide-filled silicone resins is less than the thermal conductivity of silicone resins filled with combinations of the aluminum materials with zinc oxide, at about the same level of either of the aluminum materials or zinc oxide. This is due at least in part to the greater packing density obtained from the increased volume fraction of conductive filler attained by the present invention.

tion demonstrated a thermal conductivity which is greater than that of a corresponding resin-based composition containing either aluminum oxide or zinc oxide particles alone. Such synergistic effect on conductivity, particularly thermal conductivity, is believed to be a result of effective interstitial bridging of the voids between the harder conductive filler component particles by the softer filler particles.

That is, for instance, reference to Table 1 shows that Sample No. 1 is filled with aluminum oxide at a level of about 47.63% by volume and has a thermal conductivity of about 1.13 W/m-K. This conductivity is substantially the same as that obtained by Sample No. 13, which is filled with zinc oxide at a level of about 36.34% by volume. If the two materials were mixed together, the predicted thermal conductivity of any mixture of Sample Nos. 1 and 13 is about 1.1 W/m-K. However, the observed conductivity of Sample No. 2, filled with conductive filler at a level of about 42.5% by volume which includes aluminum oxide at a level of about 35.72% by volume and zinc oxide at a level of about 6.82% by volume, is about 1.52 W/m-K, which is about 1.4 times greater than the expected value.

Determination of Density

Using the protocol set forth in ASTM D 1875 to determine the density of adhesives in fluid form, the density of 0.320

TABLE 1

| Sample No. | Conduct. filler weight % (volume %) | First conduct. filler component Type | weight % (volume %) | Second conduct. filler component Type | weight % (volume %) | Thermal conduct. (W/m-k) |
|---|---|---|---|---|---|---|
| 1 | 79.94(49.62) | aluminum oxide | 75.49(47.63) | zinc oxide | 4.45(1.99) | 1.13 |
| 2 | 72.28(42.54) | aluminum oxide | 59.78(35.72) | zinc oxide | 12.50(6.82) | 1.52 |
| 3 | 82.67(53.34) | aluminum oxide | 69.56(47.04) | zinc oxide | 13.11(6.30) | 1.68 |
| 4 | 75.86(43.00) | aluminum oxide | 64.25(38.11) | zinc oxide | 11.61(4.89) | 0.95 |
| 5 | 78.35(47.62) | aluminum oxide | 78.35(47.62) | — | — | 1.09 |
| 6 | 85.65(59.99) | aluminum oxide | 85.65(59.99) | — | — | 1.83 |
| 7 | 81.03(51.77) | aluminum oxide | 81.03(51.77) | — | — | 1.30 |
| 8 | 82.65(54.49) | aluminum oxide | 82.65(54.49) | — | — | 1.28 |
| 9 | 78.22(39.08) | zinc oxide | 78.22(39.08) | — | — | 1.31 |
| 10 | 82.54(45.77) | zinc oxide | 82.54(45.77) | — | — | 1.34 |
| 11 | 72.30(31.79) | zinc oxide | 72.30(31.79) | — | — | 0.83 |
| 12 | 67.54(27.09) | zinc oxide | 67.54(27.09) | — | — | 0.73 |
| 13 | 76.17(36.34) | zinc oxide | 76.17(36.34) | — | — | 1.11 |
| 14 | 71.62(42.23) | aluminum nitride | 60.07(37.70) | zinc oxide | 11.55(4.53) | 1.32 |
| 15 | 71.34(43.30) | aluminum nitride | 71.34(43.30) | — | — | 1.25 |

Useful conductive, resin-based compositions in accordance with the present invention include those having a volume fraction of conductive filler of at least about 30% by volume of the composition, which ordinarily exhibit a density measured by the weight-per-gallon cup method (see ASTM D 1875) at a temperature of about 25° C. in the range of from about 1.5 to about 4 g/cm$^3$ and superior conductivity, such as thermal conductivity (measured in accordance with ASTM F 433 at a temperature of 100° C.) of from about 0.8 to about 2 W/m-K [where 1 W/m-K= 6.933 BTU-in/(h-ft$^2$-°F)=0.5778 BTU/(h-ft-√F)].

By way of contrast and as shown and described above, corresponding resin-based compositions containing only aluminum oxide particles or only zinc oxide particles as a single conductive filler component are not seen as providing the same degree of conductivity as a resin-based composition filled to substantially the same extent with the combination of aluminum oxide particles and zinc oxide particles. More specifically, the combination of aluminum oxide particles (representing the harder filler component) and zinc oxide particles (representing the softer filler components) as the conductive filler in accordance with the present invencm thick samples of cured compositions were determined. For instance, cured Sample No. 2 was determined to have a density of about 2.35 g/cm$^3$ at a temperature of about 25° C. The density of 0.356 cm thick samples of the same cured composition was determined to be about 2.46 g/cm$^3$ at a temperature of about 25° C.

Secondary Scanning Electron Microscopy and Dot Map Images

Thermally conductive silicone compositions were prepared and cured as described above, and then were evaluated using secondary scanning electron microscopy ("SSEM") and x-ray dot map imaging using energy dispersive x-ray spectrometry. Photomicrographs of cross-sections of the samples were used to show the distribution of the particles, and x-ray dot map images were used to determine the average particle size in the resin matrix. For x-ray mapping, a selected metal (such as aluminum oxide or zinc oxide) was targeted by choosing a peak or peaks of the energy-dispersive spectrograph that correspond(s) to that metal.

Figure 2:
FIG. 2 is an x-ray dot map image of a silicone composition containing aluminum oxide.

A SSEM photomicrograph and an x-ray dot map image of a composition containing aluminum oxide are shown in FIGS. 1 and 2, respectively. The micrograph and x-ray dot map image show that the aluminum oxide particles are large (as compared to zinc oxide particles, and have an average size of about 12 microns in diameter), unevenly dispersed, clustered together and leaving large voids between the particles.

Figure 3:
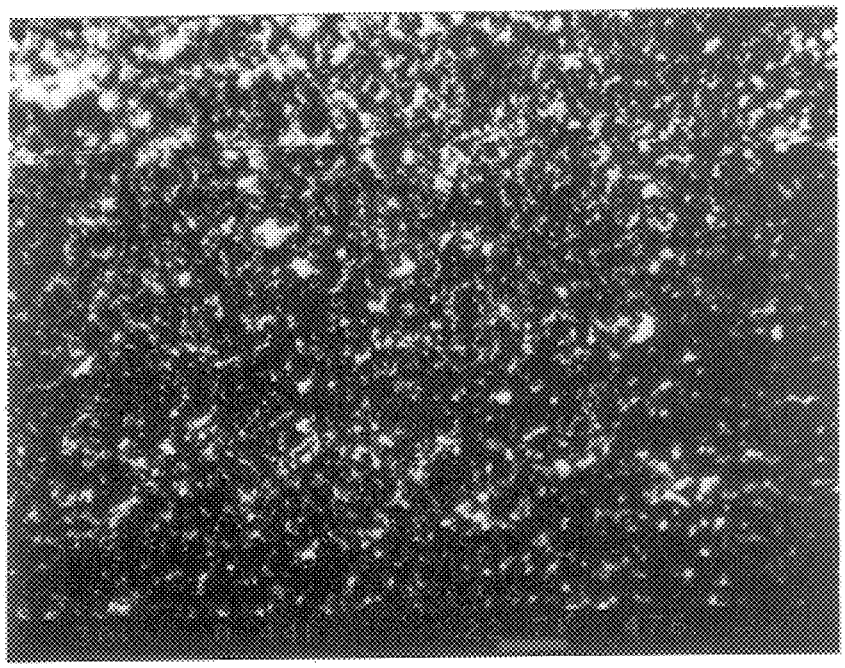
FIG. 3 is a secondary scanning electron micrograph of a silicone composition containing zinc oxide.
Figure 4:
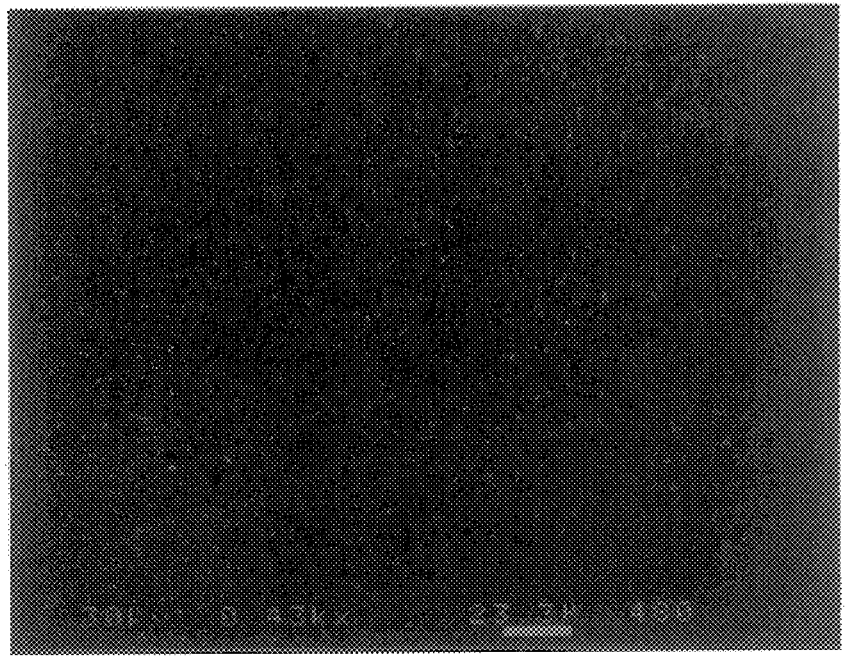
FIG. 4 is an x-ray dot map image of a silicone composition containing zinc oxide.

A SSEM photomicrograph and an x-ray dot map image of a composition containing zinc oxide are shown in FIGS. 3 and 4, respectively. The photomicrographs of the SSEM and x-ray dot map image show that the zinc particles are small (as compared to aluminum oxide particles, and have an average size of about 5 microns in diameter) and are evenly dispersed, leaving many small voids between the particles.

Figure 5:
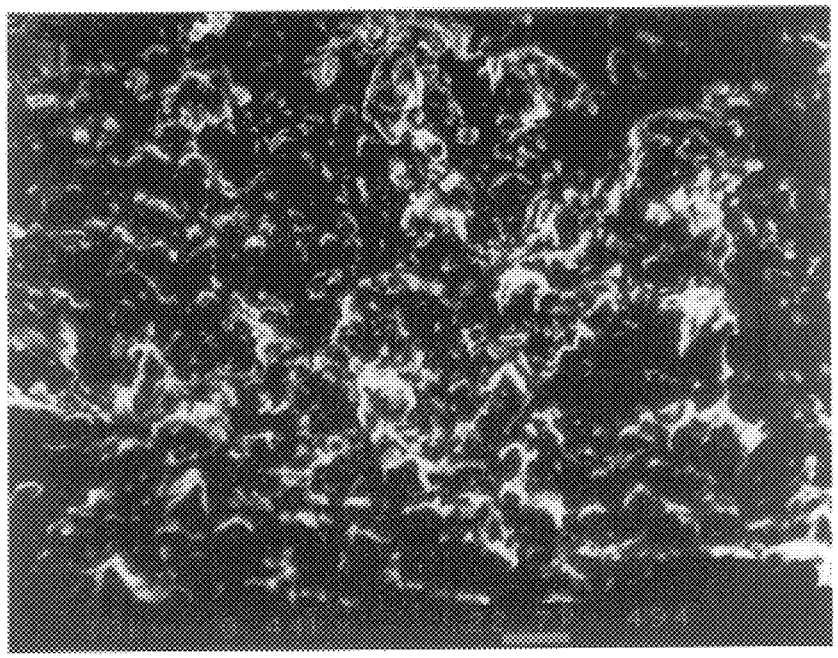
FIG. 5 is a secondary scanning electron micrograph of a silicone composition in accordance with the present invention containing aluminum oxide and zinc oxide.
Figure 6:
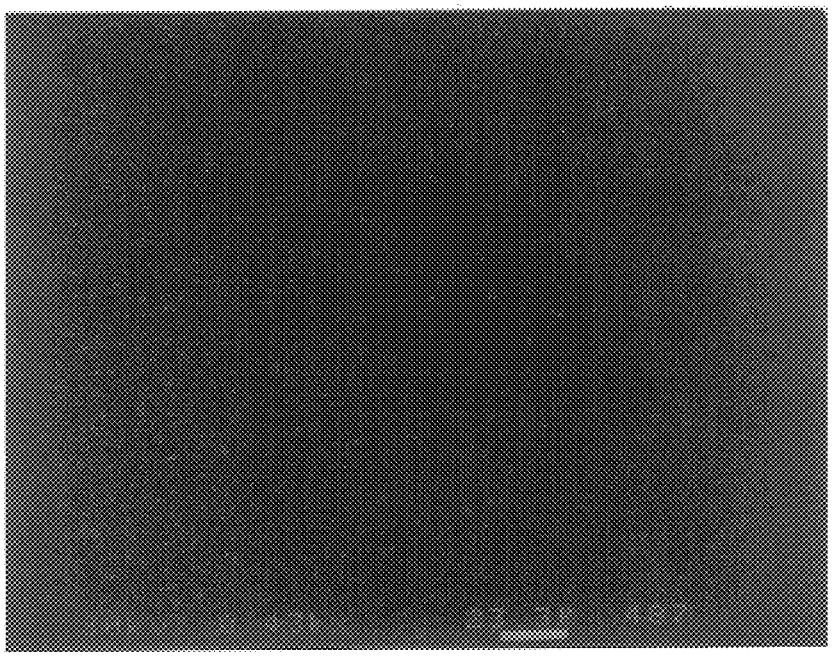
FIG. 6 is an x-ray dot map image of a silicone composition in accordance with the present invention containing aluminum oxide and zinc oxide, the x-ray dot image showing only the aluminum oxide particles.

A SSEM photomicrograph and an x-ray dot map image showing only the aluminum oxide particles of a composition containing aluminum oxide and zinc oxide are shown in FIGS. 5 and 6, respectively. The photomicrograph of the SSEM and x-ray dot map image show that the distribution of aluminum oxide particles in the composition containing both zinc oxide and aluminum oxide particles is substantially similar to the distribution of aluminum oxide particles in the composition having a conductive filler containing only aluminum oxide particles.

Figure 7:
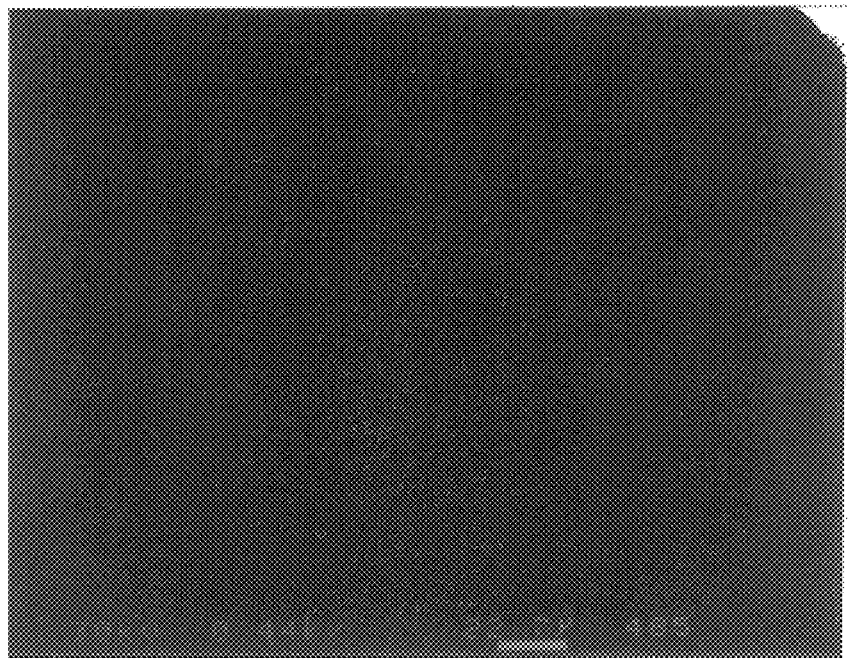
FIG. 7 is an x-ray dot map image of a silicone composition in accordance with the present invention containing aluminum oxide and zinc oxide, the x-ray dot image showing only the zinc oxide particles.

FIG. 6 is an x-ray dot map image of a silicone composition in accordance with the present invention containing aluminum oxide and zinc oxide, with the x-ray dot image showing only the aluminum oxide particles. The x-ray dot map image shows that the aluminum oxide particles are unevenly dispersed, leaving large voids. FIG. 7 is an x-ray dot map image of a silicone composition in accordance with the present invention containing aluminum oxide and zinc oxide, with the x-ray dot image showing only the zinc oxide particles. The x-ray dot map image shows that zinc oxide particles are evenly dispersed.

Figure 9:
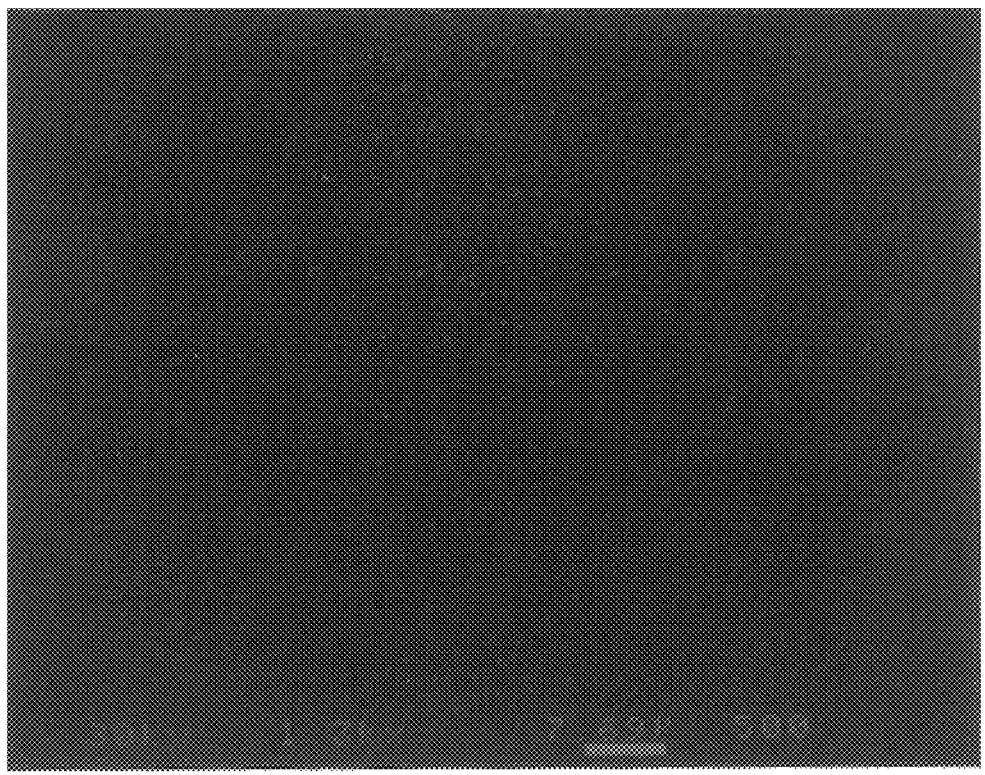
FIG. 9 is a secondary scanning electron micrograph of a silicone composition of the invention containing aluminum oxide and zinc oxide.

A SSEM photomicrograph and an x-ray dot map image showing both the aluminum oxide and zinc oxide particles of a composition containing aluminum oxide and zinc oxide are shown in FIGS. 8 and 9, respectively. The photomicrograph and x-ray dot map image show dense packing with substantially uniform particle distribution. The zinc oxide particles filled the large voids left by the aluminum oxide particles, thereby creating improved particle contact, which enhances thermal conductivity.

The photomicrographs and x-ray dot map images show that the aluminum oxide particles alone are clustered together, are unevenly dispersed, and leave large voids. The photomicrographs and x-ray dot map images further show that zinc oxide particles alone are evenly dispersed, and leave many small voids.

Neither conductive filler component alone provided a dense and uniform particle distribution. In contrast, the photomicrographs and x-ray dot map images of the silicone compositions containing both aluminum oxide and zinc oxide show a more dense and even particle distribution.

Conductive, Resin-Based Composition for Use In Bonding A Package Transistor To An Aluminum Heat Sink A specific application in which conductive, resin-based compositions according to the present invention are particularly useful is, for instance, in connection with bonding a package transistor to an aluminum heat sink. In such application, a composition may be formulated as described above from the following components in the noted amounts: about 57.45% by weight (33.97% by volume) of calcified aluminum oxide (325 mesh), about 17.65% by weight (7.42% by volume) of zinc oxide (325 mesh), and about 15.08% by weight of vinyldimethyl-terminated polydimethylsiloxane (having a viscosity of about 10,000 cps and a $M_n$ of about 64,000), about 1.97% by weight of vinyldimethyl-terminated polydimethylsiloxane (having a viscosity of about 450 cps and a $M_n$ of about 15,000), about 1.83% by weight of trimethylsilyl-terminated hydrogenmethyl dimethylsiloxane co-polymer (having a viscosity of about 50 cps, a $M_n$ of about 1,000 and about 4 to 5 hydrogen atoms per molecule), about 0.97% by weight of 3-glycidoxypropyltrimethoxysilane, about 0.22% by weight of 3,5-dimethyl-1-hexyn-3-ol, and about 0.62% by weight of platinum complex solution (having about 2.5% platinum complexed with 1,3,5-trivinyl-1,3,5-trimethyl cyclohexyl siloxane), which together with the third through seventh components occupy a volume of about 58.6l%. The formulation may also include about 0.62% by weight glass beads (having a diameter of about 0.005 inches) as a spacer. Once formulated, this composition may be applied onto either or both of the package transistor and the aluminum heat sink. Thereafter, the package transistor and the heat sink may be mated together under pressure to from an assembly having a predetermined bond line. The composition then may be cured by exposure to elevated thermal conditions of about 130° C., for a period of time of about 5 minutes in a convection oven.

The bulk cured composition was prepared by dispensing the composition into a teflon mold and curing in a heated press for a period of time of about 15 to about 30 minutes at a temperature of about 130° C. to achieve a sheet stock with dimensions of 5"×5"×0.060". The cured composition possessed the following physical properties and characteristics: thermal—thermal conductivity at a temperature of 100° C. of 1.33 W/m-K, hardness (Shore A) as measured by ASTM D-2240 of 2.6, tensile at break of 2.6 psi, elongation at break of 117%, Young's modulus of 4 psi and Tg of −40° C.; and electrical—volume resistivity as measured by ASTM D-257 of $2.9 \times 10^{14}$ ohm-cm, surface resistivity as measured by ASTM D-252 of $6.2 \times 10^{13}$ ohm and dielectric strength as measured by ASTM D-149 of 489 V/mil.

While the present invention has been exemplified above, it is clear that variations exist within the spirit and scope of the present invention which may be practiced in accordance hereof with only routine, rather than undue, experimentation. Any such variations and equivalents should provide at least suitable, if not comparable results, when viewed in connection with the results obtained from the above examples. Accordingly, such variations and equivalents are also intended to be encompassed by claims which follow.

What is claimed is:

1. A conductive composition comprising:
   (a) a conductive filler comprising:
      (i) a first conductive filler component and
      (ii) a second conductive filler component,
      wherein the first conductive filler component is relatively harder than the second conductive filler component using a Mohs hardness test, and
   (b) a resinous material,
   wherein the composition is subjected to shear mixing forces which shearingly disperse the first and second conductive filler components throughout the resinous material thereby causing the softer of the conductive filler components to fill interstitial voids formed between the harder of the conductive filler components of the composition so as to provide a volume fraction of conductive filler throughout the resinous materials in the range of about 30 to about 65% by volume of the composition; and the composition is non-curable, or is curable by cure mechanisms selected from the group consisting of moisture curable, photocurable, anaerobically-curable and combinations thereof.

2. The composition according to claim 1, wherein the composition is thermally conductive.

3. The composition according to claim 1, wherein the composition is electrically conductive.

4. The composition according to claim 1, wherein the particle size of the first conductive filler component is larger relative to the second conductive filler component.

5. The composition according to claim 1, wherein the first and second conductive filler components each are selected from the group consisting of iron, aluminum, zinc, silver, gold, lead, nickel, magnesium, boron, barium, platinum, palladium, copper, zirconium, titanium, uranium, vanadium, niobium, tungsten, silicon and conductive derivatives and combinations thereof.

6. The composition according to claim 1, when the volume ratio of first conductive filler component to second conductive filler component is about 1:6.

7. The composition according to claim 1, wherein the resinous material is selected from the group consisting of silicones, acrylates and (meth)acrylates, epoxies, urethanes, polyalkylenes, polyvinyl halides, polyesters, and combinations thereof.

8. The composition according to claim 1, wherein the conductive filler includes as the first conductive filler component from about 75% to about 95% by weight aluminum oxide, based on the total weight of the conductive filler, and as the second conductive filler component from about 5% to about 25% by weight zinc oxide based on the total weight of the conductive filler, and wherein the resinous material includes a silicone resin.

9. The composition according to claim 1, wherein after subjecting the first and second conductive filler components to shear mixing forces the average particle size of the first conductive filler component is in the range of from about 10 to about 15 microns, and the average particle size of the second conductive filler component is in the range of from about 3 to about 7 microns.

10. The composition according to claim 1, wherein after subjection to shear mixing forces the first and the second conductive filler components are densely packed in a substantially uniform manner within the composition.

11. A reaction product of a curable conductive composition according to claim 1, wherein the reaction product is formed by curing the composition with moisture, photoirradiation, exclusion of air and combinations thereof.

12. The reaction product according to claim 11, wherein the reaction product has a viscosity which is greater than the viscosity of the curable composition.

13. A process for preparing a conductive composition, said process comprising the steps of:
(a) providing the components of the composition according to claim 1, and (b) shearingly dispersing the components thereof by application of shear mixing forces to form a substantially homogeneous composition in which the first and second conductive filler components are densely packed in the composition.

14. A process for using a conductive composition, said process comprising the step of:
(a) dispensing the composition according to claim 1 onto a surface.

15. A thermally conductive silicone composition, comprising:
(a) silicone resin;
(b) thermally conductive filler comprising from about 65% to about 95% aluminum oxide particles having, after subjection to shear mixing forces, an average particle size in the range of from about 10 to about 15 microns, and from about 5% to about 35% zinc oxide particles having, after subjection to shear mixing forces, an average particle size in the range of from about 3 to about 7 microns, each by weight of the thermally conductive filler;
(c) surfactant;
(d) adhesion promoter; and
(e) catalyst,
wherein the volume fraction of thermally conductive filler throughout the silicone is in the range of about 30 to about 65% by volume of the composition; and the composition is non-curable, or is curable by cure mechanisms selected from the group consisting of moisture curable, photocurable, anaerobically-curable and combinations thereof.

16. The composition according to claim 1, which is additionally heat-curable.

17. The composition according to claim 1, wherein the composition is moisture curable and further comprises (c) a moisture-cure promoter.

18. The composition according to claim 1, wherein the composition is photocurable and further comprises (c) a free radical propagator to enhance the rate of cure.

19. The composition according to claim 1, wherein the first and second filler components each are selected from the group consisting of oxides of aluminum, magnesium, zinc and silicon.

20. The composition according to claim 1, wherein the first and second conductive filler components are each selected from the group consisting of oxides of aluminum and silicon.

21. The composition according to claim 1, wherein the first and second conductive filler components are each selected from the group consisting of oxides of magnesium and zinc.

22. A package transister/heat sink assembly assembled using the composition according to claim 1.

* * * * *

UNITED STATES PATENT AND TRADEMARK OFFICE
CERTIFICATE OF CORRECTION

PATENT NO. : 6,284,817 B1
DATED : September 4, 2001
INVENTOR(S) : Robert P. Cross et al.

It is certified that error appears in the above-identified patent and that said Letters Patent is hereby corrected as shown below:

<u>Column 4,</u>
Line 4, change "Generally" to -- generally --

<u>Column 16,</u>
Line 22, change "from" to -- form --
Line 57, change "," to -- ; --

Signed and Sealed this

Twenty-third Day of July, 2002

*Attest:*

*Attesting Officer*

JAMES E. ROGAN
*Director of the United States Patent and Trademark Office*